(12) United States Patent
Dutta

(10) Patent No.: US 6,748,450 B1
(45) Date of Patent: Jun. 8, 2004

(54) DELAYED DELIVERY OF WEB PAGES VIA E-MAIL OR PUSH TECHNIQUES FROM AN OVERLOADED OR PARTIALLY FUNCTIONAL WEB SERVER

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/428,409

(22) Filed: Oct. 28, 1999

(51) Int. Cl.[7] .......................... G06F 15/16; G06F 11/00
(52) U.S. Cl. .......................... 709/246; 709/206; 714/18
(58) Field of Search ................................. 709/226, 223, 709/246, 206, 217, 218, 219, 203, 228; 714/18, 748; 370/216

(56) References Cited

U.S. PATENT DOCUMENTS

| | | | |
|---|---|---|---|
| 5,257,369 A | | 10/1993 | Skeen et al. |
| 5,774,660 A | | 6/1998 | Brendel et al. |
| 5,774,668 A | * | 6/1998 | Choquier et al. ........... 709/223 |
| 5,793,972 A | | 8/1998 | Shane |
| 5,860,074 A | | 1/1999 | Rowe et al. |
| 5,878,224 A | | 3/1999 | Smith |
| 5,953,392 A | | 9/1999 | Rhie et al. |
| 5,987,504 A | * | 11/1999 | Toga ........................... 709/206 |
| 6,055,564 A | * | 4/2000 | Phaal ........................... 709/207 |
| 6,094,671 A | | 7/2000 | Chase et al. |
| 6,098,180 A | * | 8/2000 | Kobata et al. ................. 714/18 |
| 6,134,584 A | | 10/2000 | Chang et al. |
| 6,148,330 A | | 11/2000 | Puri et al. |
| 6,154,769 A | * | 11/2000 | Cherkasova et al. ........ 709/207 |
| 6,243,761 B1 | * | 6/2001 | Mogul et al. ................ 709/246 |
| 6,381,709 B1 | * | 4/2002 | Casagrande et al. .......... 714/18 |
| 6,430,624 B1 | | 8/2002 | Jamtgaard et al. |
| 6,438,592 B1 | * | 8/2002 | Killian ......................... 709/224 |
| 6,449,637 B1 | * | 9/2002 | Toga ........................... 709/206 |
| 6,453,438 B1 | * | 9/2002 | Miller et al. ................. 714/749 |

FOREIGN PATENT DOCUMENTS

| | | | |
|---|---|---|---|
| EP | 0967559 A1 | 12/1999 | |
| EP | 1162805 A1 | * 12/2001 | ........... H04L/29/06 |
| GB | 2363224 A | * 12/2001 | ........... G06F/17/30 |
| GB | 2380096 A | * 3/2003 | ........... H04L/12/58 |
| WO | WO99/57657 | 11/1999 | |

OTHER PUBLICATIONS

Rodriguez, P. et al., "Continuous multicast push of Web documents over the Internet", IEEE Network, vol. 12, pp. 18–31, Apr. 1998.*
Abdelzaher, Tarek F. et al., "Web content adaptation to improve server overload behavior", Computer Networks, vol. 31, issue 11–16, abstract only, May 1999.*
Fielding, R. et al., "Hypertext Transfer Protocol—HTTP/1.1", 2616, pp. 1–114, Jun. 1999.*
Tang, Wenting et al., "Intelligent browser initiated server pushing", IEEE IPCCC '00, pp. 17–23, Feb. 2000.*
"How the Internet Works", P. Gralla, QUE, 4th Edition, 9/98, pp. 188–195.
IBM Patent Application, AT9–98–355, S/N 09/292,191, filing date Apr. 15, 1999.
IBM Docket AUS990913US1, Sending Full–Content Data To A Second Data Processing System While Viewing Reduced–Content Data on A First Data Processing System, 35 pages, pending filling date Apr. 5, 2000.

* cited by examiner

*Primary Examiner*—Jason D. Cardone
(74) *Attorney, Agent, or Firm*—Marilyn Smith Dawkins (57) ABSTRACT

A system, method and program of the invention enables an overloaded or partially functional Web server in an Internet environment to receive an HTTP request for data from a client during a given communication session. The Web server determines whether it can satisfy at least a portion of the request at a present time. If so, then a portion of the data is sent to the client during the given session, and all of the requested data is sent at a later time and outside of the given session either by e-mail or a push technique.

8 Claims, 6 Drawing Sheets

FIG. 1

PRIOR ART

DELAYED DELIVERY OF WEB PAGES VIA E-MAIL OR PUSH TECHNIQUES FROM AN OVERLOADED OR PARTIALLY FUNCTIONAL WEB SERVER

BACKGROUND OF THE INVENTION

1. Field of the Invention

This invention relates to techniques for delivering Web pages from an overloaded or partially functional Web server to a client, and more specifically to a system, method and program for sending to a client a requested document via e-mail or a Push technique after the original session with the client terminates.

2. Description of the Related Art

The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web". Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

Overloading is a term that is used when the processing and/or resource capabilities of a system are being used to the point where the system's efficiency becomes degraded. Programs exist today that can determine whether or not a system is becoming overloaded and to what extent the system resources are being used. For example, Windows 95 operating system has software modules that determine how much of the system resources are being used.

Figure 1:
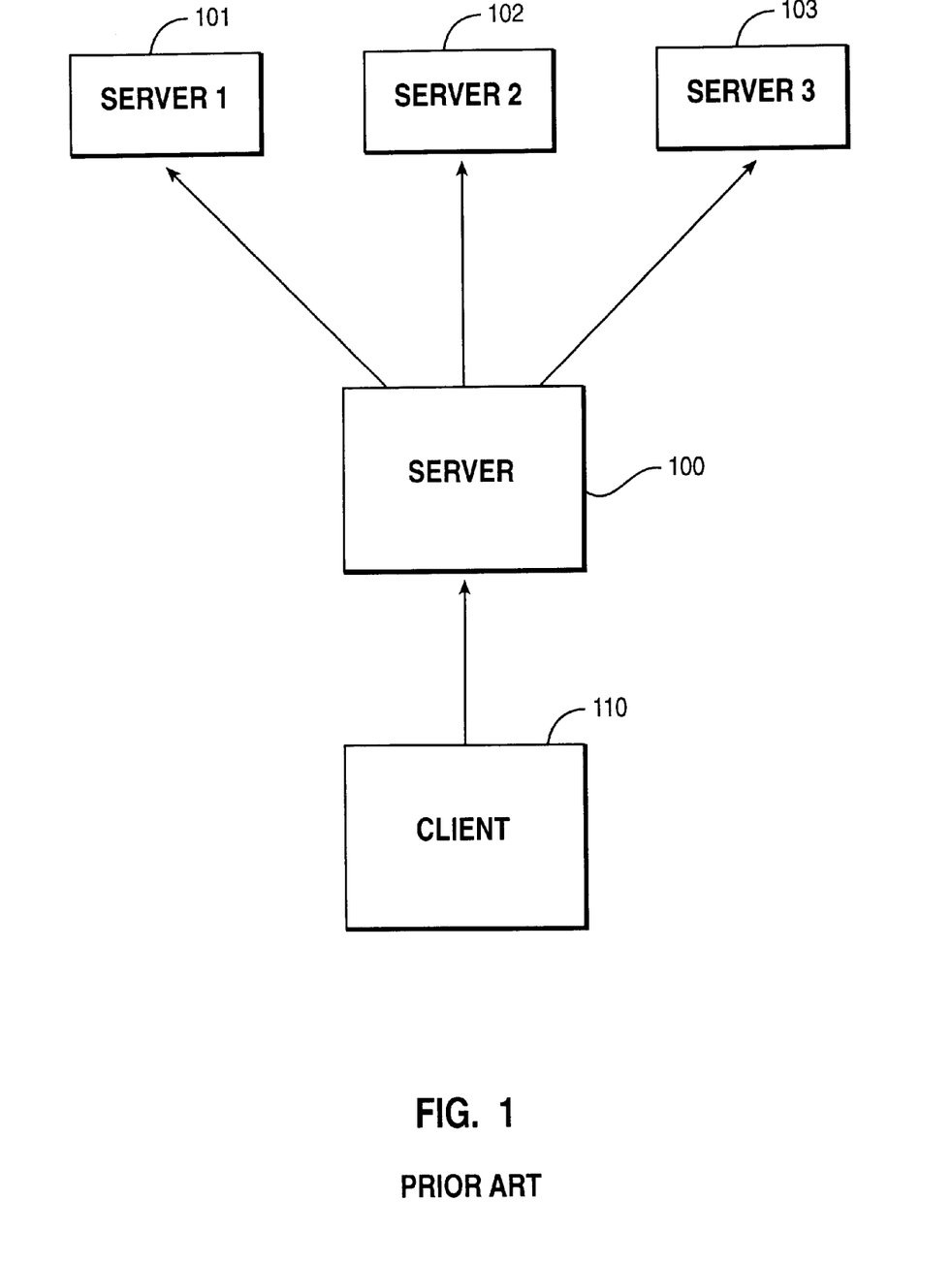
FIG. 1 illustrates a structure of clients and servers in a network environment where the server splits up its work amongst other servers by using load balancing techniques known in the art.

FIG. 1 shows a prior art system for load balancing when a server is overloaded. Server 100 is linked to several servers 101, 102, 103, and a client 110. Since the server 100 is not powerful enough, it splits its work among the other servers 101, 102, 103. A request from a client 110 would be directed by the server 100 to one or more of the other servers 101, 102, 103, depending on which of the servers 101, 102, 103 is less busy. Server 100 tries to balance the work load amongst the other servers. Servers 101, 102, and/or 103 can then communicate directly with the client 110 or respond to the client through the server 100. Essentially, the server splits up its workload amongst the various machines. This is the way that servers presently prevent overloading in server based systems.

Overloaded or partially functional Web servers are a major problem on the Internet. If a client is trying to get Web pages from such a server, the client may either have to wait an unreasonable amount of time to receive the requested pages, or the client may never receive the requested Web pages.

Web servers can get overloaded or become partially functional for many reasons. One cause of overloading results from very high usage of servers at certain times of the day and very little usage at night. It has been observed that Web servers become overloaded during the middle of the day when employees of corporations are taking their lunch breaks and are checking the news from Web servers. Different Web servers get overloaded at different times of the day. For example, a Web server for the Los Angeles Times newspaper may get overloaded from 9:00 a.m. to 5:00 p.m. Pacific Time when people on the west coast are checking the news, but may not be overloaded at other times of the day. Likewise, corporate Web sites may get overloaded during normal working hours, but may be greatly underutilized at nights, during weekends, or during holidays, when most employees are not working.

Overloading is also caused by the sudden very high usage of a reference to a site in a widely read news media (e.g., a reference to a Web site in the Internet edition of the New York Times). This type of overloading happens very often. This happens when a small Web site typically comes into the news because it has made a new product or has made a recent press release. Typically users reach the site by following links from a daily newspaper. For example, a very common occurrence happens when a major newspaper, e.g., the New York Times, publishes an article on a new technology or science or health feature, and the article provides links to other Web pages. Typically, in Web articles, if any other pages are referenced, those pages are provided at the end of the article as links. Internet links are used in Web articles in the same way as Bibliographies are used in printed articles. If a small Web site is cited as a link in an article that has a high volume of readers, the small site which does not have much capacity often gets overloaded.

It is difficult to design a Web site to handle overloading, especially overloading caused by sudden high usage, because it is counterproductive to have a large mainframe machine or a large server handle a relatively small Web site that under normal conditions does not utilize the full processing power of the server machine.

The generation of dynamic Web content, i.e., Web content that is generated by Web servers on the fly upon request (e.g., via CGI scripts, Server side Javascript, or servlets), also consumes a lot of resources and are time intensive and can overload a Web server if multiple clients request dynamic Web content at the same time. These new technologies go beyond just sending static HTML pages.

The HTML specification allows many embedded images in an HTML page. Web servers which have very high number of embedded images have a big overload spike whenever the pages are downloaded with images. This assumes that the images are from the same Web server as the parent HTML file. These sudden increases in the peak load on a Web server are another reason for a Web server to become overloaded or partially functional.

Currently, Web servers have become very complicated, especially e-commerce systems, and they often rely on databases and file servers and other types of servers. A Web server is no longer a single computer. Instead, the Web server is becoming just an interface that has connections to file servers, databases, credit card verification servers, customer database servers, and so forth. Any of these other servers can become incapacitated for various reasons, e.g., the network link is down, a computer is down or overloaded, etc. As a result, the Web server, interacting with a client and these other servers, may be functional, but it may not be totally functional since one or more of the supporting servers are not available for the Web server to perform all of its tasks. As such, the Web server may be temporarily incapacitated or partially functional.

Currently, when a Web server is overloaded or partially functional, the following can occur:

i) The Web client keeps waiting for a requested document to arrive and never gets it. Since the Web server is busy, the Web server can not even send to the Web client an HTTP return code to indicate what went wrong. As such the client waits for the server to return something. Typically, the client has a certain time that it has set up after which if the client has not received a response from a server, it times out. The term "time out" refers to a situation when the Web client has set up a maximum time it is willing to wait for a document to arrive before terminating the request, and that time is reached.

ii) Some servers realize that they have a problem and send an immediate response stating something similar to the following:

"This server is experiencing difficulties. Please try again later."

iii) The server returns an HTTP error return code.

Any one or more of the above three events causes problems for a client because the user of the client has to remember to go back to the server at a later time to make the request. This is burdensome for the user.

SUMMARY OF THE INVENTION

The system, method and program of the invention enables an overloaded or partially functional Web server to keep track of the clients that send requests, and to send the data at a later time in a different session of the network communication. More specifically, the overloaded, or partially functional, Web server carries out any one or more of the following. The Web server sends the requested resource (typically an HTML page) by e-mail or push techniques at a time when it is not overloaded. Alternatively, the Web server sends the basic abbreviated data to the client, such as the text only data; and then sends the full data (the data that includes the inline images or other dynamically generated data) later on via e-mail or push techniques.

The advantages of the invention include, but are not limited to, the following:

i) On the client side, although the client request is not immediately satisfied, the client still gets the resource without the client having to ask for it again.

ii) On the server side, the server's advantage is that the server can perform load balancing deliberately under its own control. The server can carry out this load balancing using various mechanisms. For instance, the server can regard some users as being more important than others and thus desire to satisfy their requests first. For example, a paying subscriber, such as a client who visits a Web site quite often, may get preferential treatment when the Web server is busy such that the paying subscriber may get immediate results from a request while other clients get the request satisfied at a later time through e-mail.

iii) The possibilities of "Denial of Service" responses is reduced, although they can still occur in extreme circumstances.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 2:
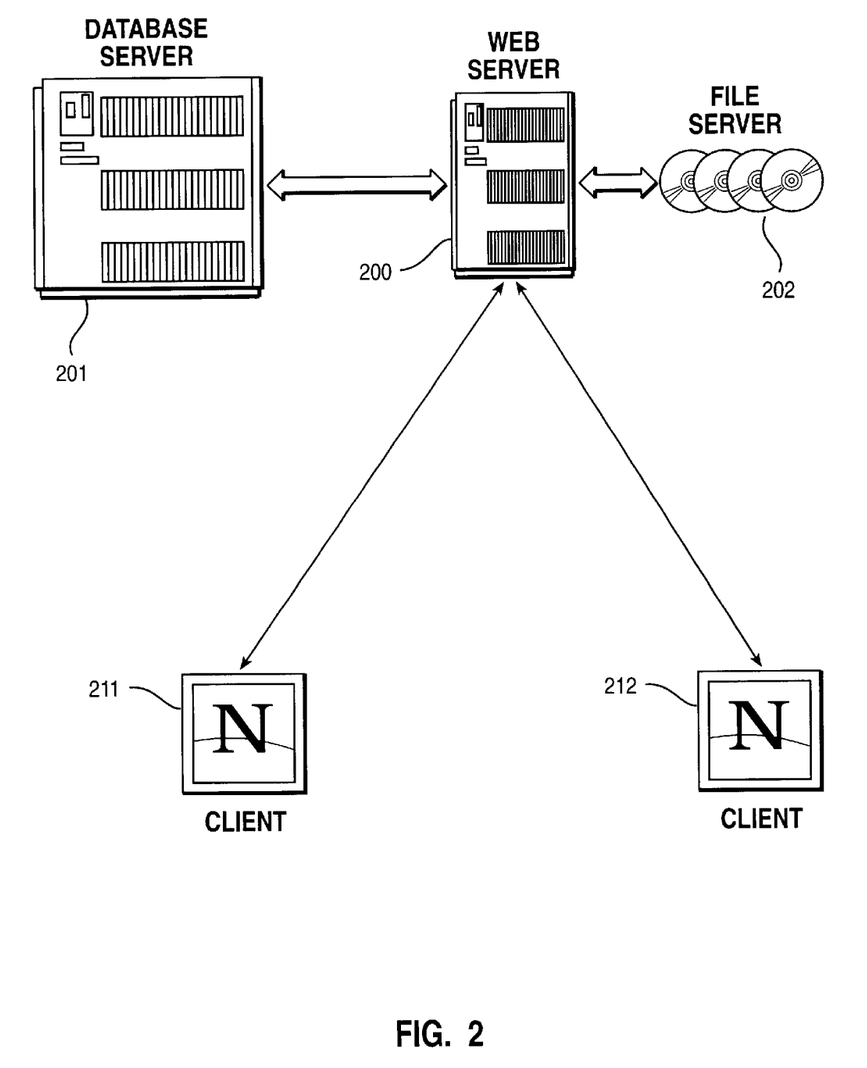
FIG. 2 illustrates a structure of clients and servers in a network environment, such as the Internet, using the Web server operation of a preferred embodiment of the invention.

FIG. 2 illustrates a simplified Internet environment for carrying out the method of operation of a Web server 200 when it is overloaded or partially functional. The structure of FIG. 2 is simplified for purposes of describing the preferred embodiment of the invention. Although FIG. 2 does not illustrate an environment where the Web server is connected to other servers to do load balancing as described with respect to FIG. 1, the techniques of the preferred embodiment are just as applicable in such an environment, also.

As shown in FIG. 2, the Web server 200 is connected to a database server 201 and a file server 202. The database server 201 and file server 202 and other such servers are further referred to herein for convenience as serving servers to the Web server. The Web server 200 is also connected to various clients 211, 212. Client 211 and 212 are browsers that connect to the Web server 200. The components shown in FIG. 2 will be further described with reference to the flowchart of FIG. 3.

Figure 3:
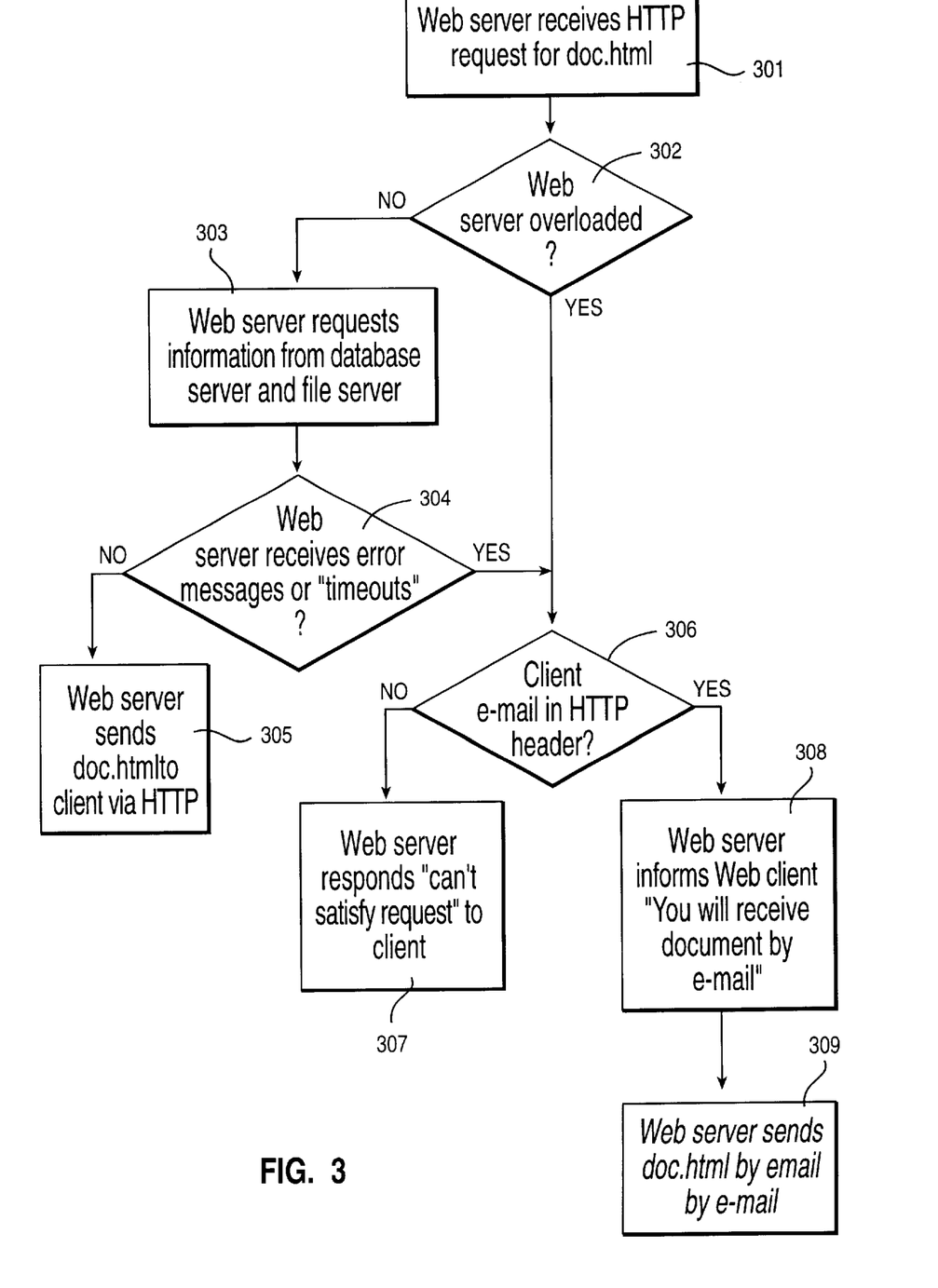
FIG. 3 is a flow chart for the operation of the system utilizing an e-mail technique as a result of the Web server being overloaded or partially functional.

With reference to FIG. 3, the Web server 200 receives an HTTP request for a document called "doc.html," step 301. The document does not have to be a static Web page; it could be a CGI script, a dynamic page, and not necessarily a specific predetermined HTML document. The request could be interpreted by the server for anything, essentially. The Web server 200 then determines if the Web server is overloaded, step 302. Most Web servers that do have programs running on them can determine to what extent it is overloaded. Programs are known that enable a server to determine, through an interface to such a program, the amount of memory utilization, the amount of capacity and the number of programs that are running on a system, etc. Similar programs or other means could be used by the Web server to determine if it is overloaded. Such programs would be used periodically by the Web server to check whether the Web server is overloaded or not. Referring to FIG. 3, if the Web server is not overloaded, then the Web server requests information from the database server 201 (FIG. 2) and file server 202 (FIG. 2), step 303. It is possible that the database server or file server is overloaded or not fully functional. If either server is overloaded or not fully functional, then the Web server may receive error messages or a time out, step 304. If the database server or file server or other serving server is not overloaded and is functional, then the Web server sends the requested data, e.g., doc.html, to the client via the HTTP protocol, step 305.

Referring back to step 304, the Web server contacts its serving servers, e.g., the database server and file server, to determine if the serving servers are working properly. Basically, the Web server keeps track, through the use of a program, whether each system component is functioning or not. If the Web server is determined to be overloaded, step 302, or a serving server is determined to be overloaded or only partially functional, step 304, then the Web server determines whether there is another way to send the requested data to the client in a different network session later on, step 306.

Part of the determining step of step 302 also takes into consideration the extent to which the server is overloaded. If the server is to send data to the client later on, then the server will have to keep track of the client and the client's corresponding request using a database or other tracking means. Since any such tracking will consume some resources of an already overloaded server, the server determines whether less resources would be used in servicing the request immediately, without spending resources tracking the client and the corresponding request; or whether less resources would be used by tracking the client and corresponding request and sending the request at a later time. If the request, or any part of it, is to be sent at a later time, then it is sent outside of, or separate from, the initial network session during which the client's request originated.

The flowchart, at step 306, indicates a preferred embodiment for determining if there is another way to send the requested data by determining if the clients' e-mail address was contained within the HTTP header of the client request. However, the Web server could send the data by various other means or techniques, known today or in the future. For example, sending data via e-mail can be considered as a kind of push technique since it is sent later. Other push techniques could also be used.

As shown in the preferred embodiment, if the client's e-mail is not in the HTTP header, or alternatively, the Web server can not determine any other way of sending the data later, the Web server responds to the client that the Web server cannot satisfy the client's request, step 307. If the client's e-mail is in the HTTP header, or alternatively, the Web server can determine another way to send the data later, then the Web server informs the client that the client will receive the data by e-mail or some other means, step 308. Then, in a different network communication session at a later time, the Web server sends the data, e.g., doc.html, by e-mail, step 309.

The e-mail address is determined from an HTTP GET Request from the Web client to the Web server by looking at the "From" request header field. The From request header field that is part of the HTTP 1.1 standard can be used to determine the e-mail address of the user. Excerpts from the standard follows below:

RFC 2616 Draft Standard "Hypertext Transfer Protocol—HTTP/1.1", Internet Engineering Task Force.
14.22 From
The From request-header field, if given SHOULD contain an Internet e-mail address for the human user who controls the requesting user agent.
An example is:
From: webmaster@w3.org
The interpretation of this field is that the request is being performed on behalf of the person given, who accepts responsibility for the method performed.
The Internet e-mail address in this field MAY be separate from the Internet host which issued the request. For example, when a request is passed through a proxy, the original issuer's address SHOULD be used.

The client SHOULD NOT send the From header field without the user's approval, as it might conflict with the user's privacy interests or their site's security policy. It is strongly recommended that the user be able to disable, enable, and modify the value of this field at any time prior to a request.

It should be noted that it may not be possible to send all types of documents later by e-mail, such as dynamic documents. Instead, the Web server may send an e-mail at a later time to the client indicating that the Web server is now operational, i.e., not overloaded or not just partially functional, and is able to service the client's document request. That is, the server may e-mail the client stating that the server is now up and ready and is functioning, and that the client should try the server again with the client's document request. Such a note to the client could be sent by e-mail, instant messaging, as a display on a computer monitor, or other technique. As such, the server may just inform the client to resubmit the request, instead of sending the document. This later notification is useful if the data is too large to be sent via e-mail, or if a form is being requested that requires input by the client or other user interaction. In other embodiments, sending a static document by e-mail at a later time, in place of receiving the dynamic document, is still useful to the user because the user can click on the static document in the user's e-mail and get back to the desired Web page.

Instead of using e-mail to send the requested data or document at a later time, the Web server could use various other techniques such as push. That is, the server just needs to know where to send the data to the client later on, by either knowing the client's e-mail address or IP address or some other way for delivering the requested data.

Push technology applies when a client has given a server permission to send data to the client and the client is willing to accept data to the client's own computer, such as to the client's hard disk files or other nonvolatile storage. Contrary to this, for e-mail, the data goes to a person or to an entity or organization that can be accessed by many computers. A push technique sends the data to a specific computer instead of a specific e-mail address. As such, if a push technique were to be used, then step 306 of FIG. 3 would determine if the client had given permission and other appropriate information for the server to send the document to the client's specific computer where the request originated.

Push technology is characterized by the Web server proactively sending documents or information to a Web client or user. E-mail is actually a special kind of push technology that has been prevalent for a long time.

Although technically it is correct to refer to e-mail as a type of push, in general usage when push is mentioned, e-mail is typically not included among push techniques on the Web. In the case of e-mail push, the Web server sends information to an electronic address known as e-mail address. Typically, the e-mail can be read from any computer that can connect to the corresponding e-mail server where the e-mail of the user resides.

The system, method, and program of this invention encompasses not just delayed delivery via e-mail, but also via push technology. Typically, push technology schemes can be broadly classified as follows:
i) Push simulated by client initiated pull (client-pull); and
ii) Push initiated via Web Server (server-push).

In Push simulated by client initiated pull, the server sends a small push definition file to the client. The small push definition file contains information on the frequency, timings, schedule, etc. with which the client should automatically download data from the server. The client periodically communicates with the server (even when the user is not directly using the Web browser on the client), based on the information present in the push definition file and secures the documents from the server. Since the client is deliberately pulling the information from the server, it is often termed "push via client-pull."

Figure 4:
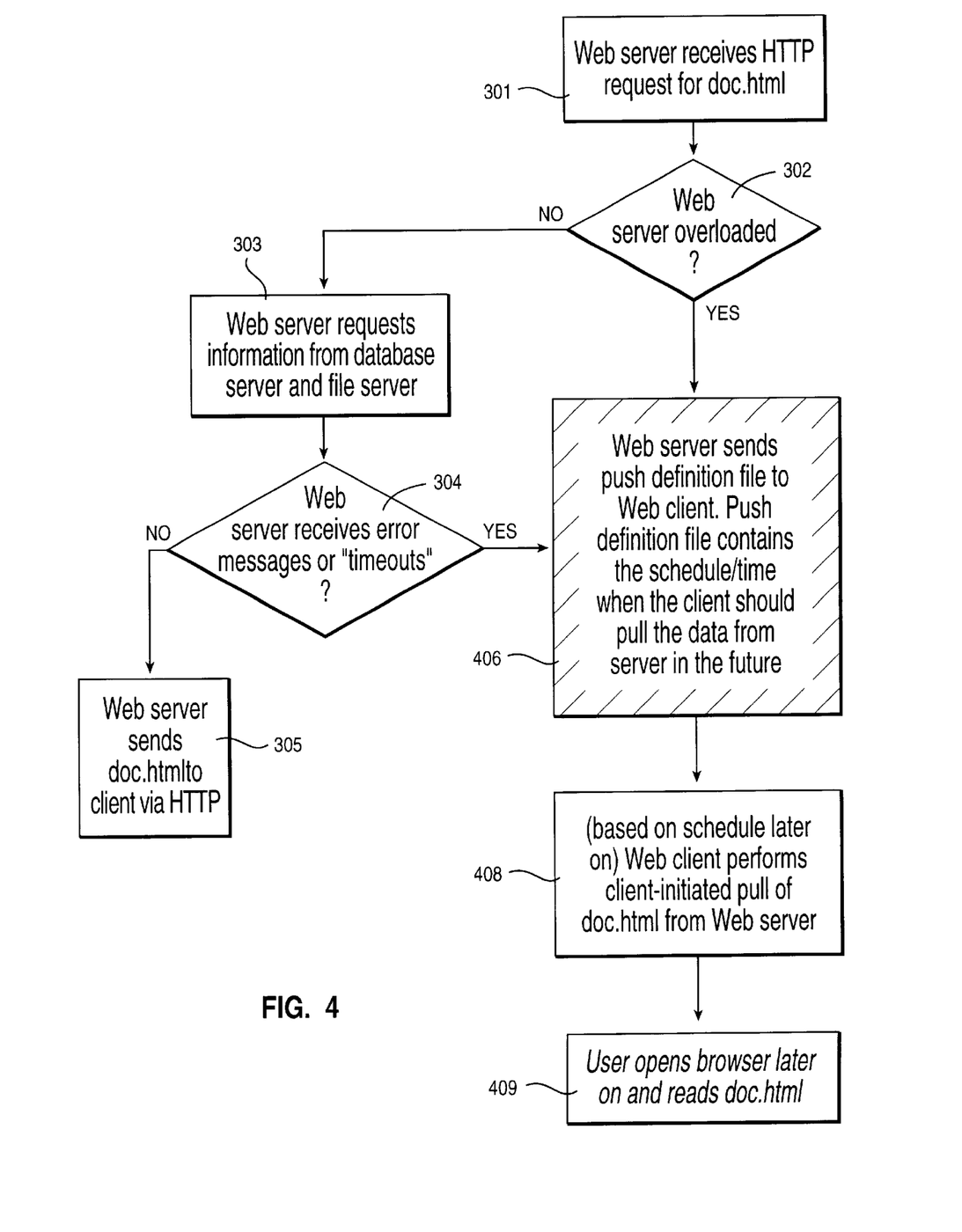
FIG. 4 is a flow chart of the system utilizing a client-pull technique.

FIG. 4 provides a flowchart of the system via client-pull. Steps 301, 302, 303, 304, and 305 are essentially the same as for FIG. 3. At step 406, the Web server sends a push definition file to the Web client. The push definition file contains the schedule/time when the client should pull the data from the server in the future. The push definition file, in the simplest case, may include the time when the server is not overloaded, e.g., if at 3 p.m. the server is overloaded but it expects that at 8 p.m. the overloading will be over, the push definition file can contain the time 8 p.m. as the time when the client should attempt to pull doc.html. The Web client then performs a client-initiated pull of the data, e.g., doc.html, from the Web server, according to the time indicated in the push definition file, 408. At any time later, the user then opens the browser and reads the data from the client's hard disk 409.

An alternative form of push is Push initiated by Web Server. Here the client computer has a fixed electronic address, e.g., an IP address, and is always running so that it can receive data to its disk. The client computer provides permission to the Web server to send data if and when the server desires. The server sends data to the client computer whenever it determines the need to do so. The user typically would start a Web browser on the client, and read the information at the user's leisure. It is not always necessary for the Web client to run continuously. A proxy server can accept data on behalf of the Web client when the Web client is not running and forward the data to the Web client when the Web client is running. However, in such a case, the proxy server must accept data on behalf of the electronic address of the Web client.

Figure 5:
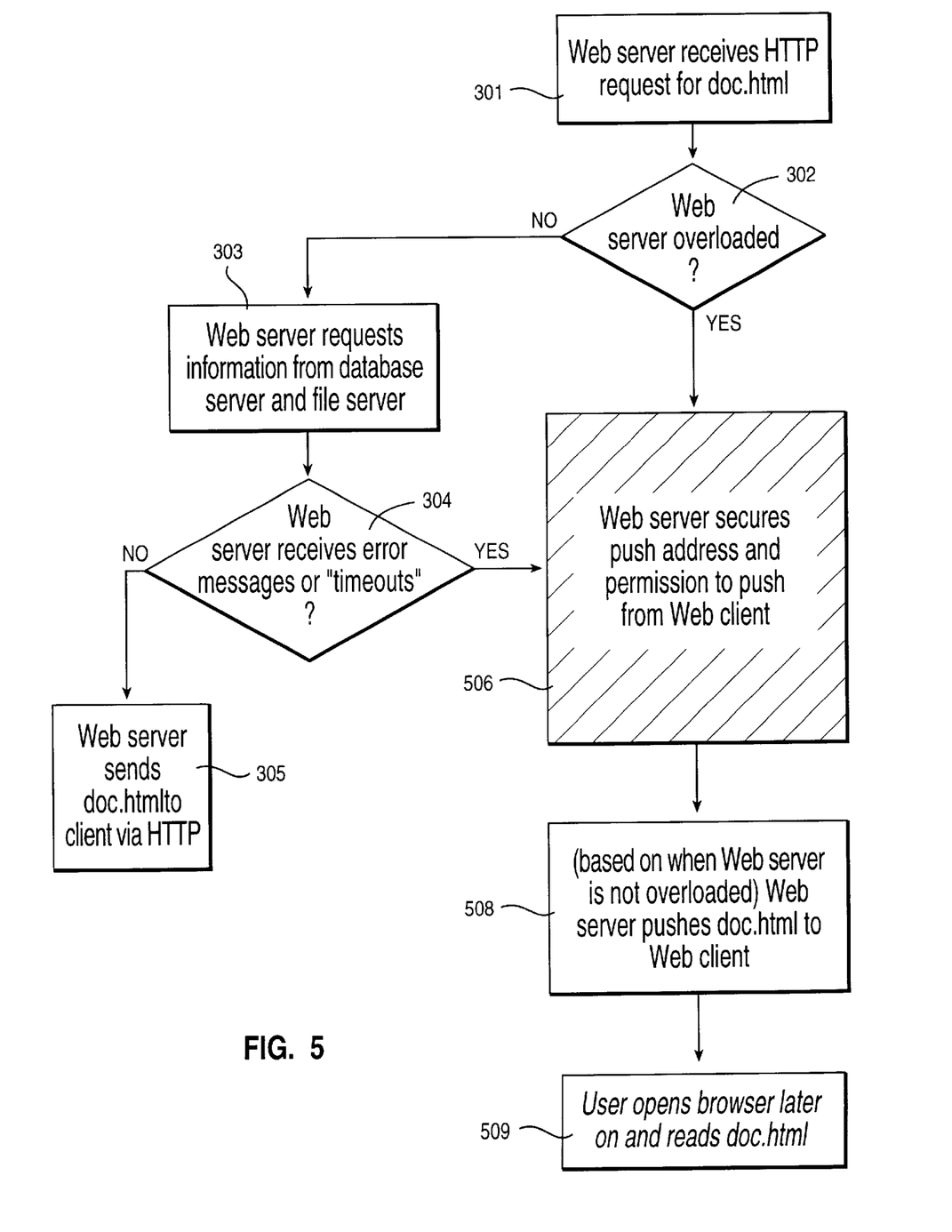
FIG. 5 is a flow chart of the system utilizing a server-push technique.

FIG. 5 provides a flowchart of the system via server-push. Again, steps 301, 302, 303, 304, and 305 are essentially the same as for FIG. 3 as described above. Then, once it is determined that the Web server is overloaded or only partially functional, the Web server secures a push address and permission to push from the Web client, step 506. The Web server then pushes the data, e.g., doc.html, to the Web client based upon a time when the Web server is no longer overloaded step 508. The user opens the browser later on and reads the data, step 509.

Besides, receiving a client address along with the push permission, there are two basic ways that a Web server can get information. One way is through the HTTP header, and a second way is through a cookie. Whenever, a Web client requests information from a Web server, e.g., through a GET request, the client must always send an HTTP header. It should be noted that even if the e-mail information is not in the HTTP header, the Web server may still know how to send the client data by using cookies, which store user information, from previous visits by the client/user to the Web server. Web servers which have cookies and have put a cookie onto the hard disk of a client enables the cookie to be sent back to the Web server upon subsequent GET requests. Cookies can contain valuable information such as identifying the client/user. Whenever there is a cookie stored in a computer, and the cookie belongs to a particular server, the cookie will get sent back to that server with each and every GET request that is sent to that same server. As such, since the cookie can contain identifying information, the Web server can identify the client/user who has sent a GET request through the use of cookies. The identifying information within the cookie can then be used by the server to send the requested data at a later time and through alternative means such as through e-mail or instant messaging, or through push techniques.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass program code, and/or one or more computer programs, and/or data files accessible from one or more computer-readable devices, carriers, or media, such as magnetic storage media, "floppy disk", CD-ROM, network transmission lines or any signal bearing media. Of course, those skilled in the art will recognize that many modifications may be made to this configuration without departing from the scope of the present invention.

The foregoing description of the preferred embodiments of the invention has been presented for the purposes of illustration and description. It is not intended to be exhaustive or to limit the invention to the precise form disclosed. Many modification and variations are possible in light of the above teaching. For example, although preferred embodiments of the invention have been described in terms of the Internet, other network environments including but not limited to wide area networks, intranets, and dial up connectivity systems using any network protocol that provides basic data transfer mechanisms may be used.

Figure 6:
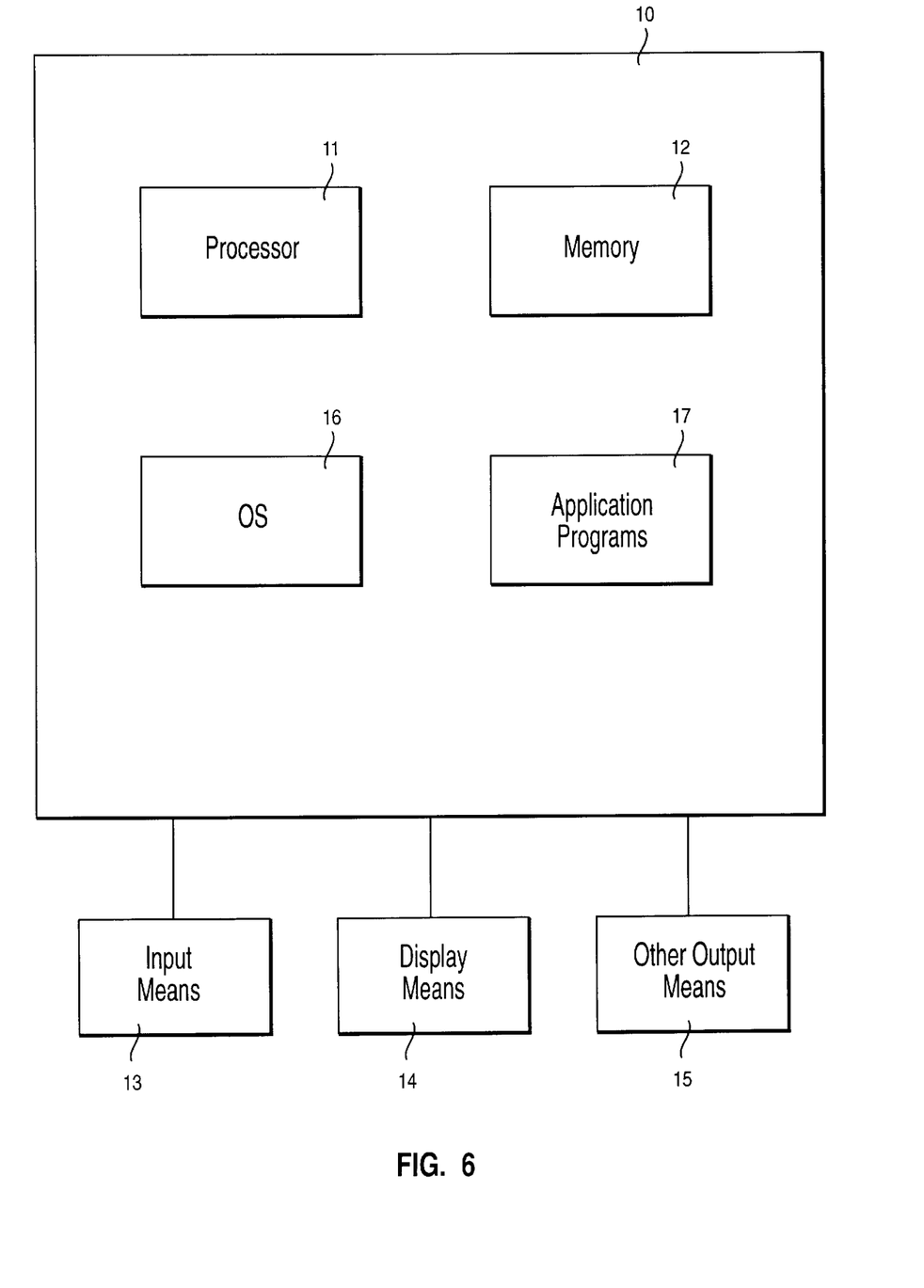
FIG. 6 illustrates a block diagram of a computer system that may be used as a server and/or a client in the network system.

FIG. 6 depicts a block diagram of a typical computer system 10 used as a client or server or both. The computer includes at least one processor 11 and memory 12. The computer may be, but is not limited to, a personal computer, laptop, workstation, mainframe or hand held computer including palmtops, personal digital assistants, smart phones, cellular phones, etc. The computer system includes input means 13 such as keyboard, mouse, track ball, light pen, pen-stylus, voice input system, touch sensitive device, and/or any other input means. Also included are display means 14 and/or any other output device 15 including network communication devices. Memory 12 includes volatile or nonvolatile storage and/or any combination thereof. Volatile memory may be any suitable volatile memory device, e.g., RAM, DRAM, SRAM, etc. Nonvolatile memory may include storage space, e.g., via the use of hard disk drives, tapes, etc., for data, databases, and programs. The programs in memory include an operating system 16 and application programs 17. For the client, one of the application programs The exemplary embodiment shown in FIG. 6 is provided solely for the purposes of explaining the preferred embodiments of the invention; and those skilled in the art will recognize that numerous variations are possible, both in form and function. For instance, any one or more of the following—the processor and/or memory and/or the input/output devices—could be resident on separate systems such as in a network environment.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by letters patent is set forth in the following claims:

What is claimed is:

1. A method for use by a web server in a network environment comprising:

receiving an HTTP request for data from a client during a given session of a network communication;

determining if at least one of the following conditions are present i) the web server is overloaded, and ii) the web server is partially functional;

determining whether the web server can satisfy at least a portion of the HTTP request at a present time even if at least one of the conditions is present;

sending a portion of the data to the client during the given session; and sending, by e-mail to an e-mail address of a user using the client, all of the requested data at a later time and outside of the given session if it is determined that the web server is capable of satisfying the portion of the HTTP request at the present time.

2. A method for use by a client in a network environment comprising:

sending an HTTP request to a Web server during a given communication session;

receiving, within the given communication session, an abbreviated content of requested data, when the Web server can satisfy at least a portion of the HTTP request at a present time even if at least one of the following conditions are present i) the Web server is overloaded, and ii) the Web server is partially functional; and receiving full content of the requested data from the Web server at a later time and outside of the given session via e-mail to an e-mail address of a user of the client.

3. A web server having means for communicating with a client in a network environment, the web server comprising:

means for receiving an HTTP request from the client for data during a given session of a network communication;

means for determining if at least one of the following conditions are present i) the web server is overloaded, and ii) the server is partially functional;

means for determining whether the web server can satisfy at least a portion of the HTTP request at a present time even if at least one of the conditions is present;

means for sending a portion of the data to the client during the given session; and means for sending, by e-mail to an e-mail address of a user using the client, all of the requested data at a later time and outside of the given session if it is determined that the web server is capable of satisfying the portion of the HTTP request at the present time.

4. A client having means for communicating with a server in a network environment, the client comprising:

means for sending an HTTP request to a Web server during a given communication session;

means for receiving, within the given communication session, an abbreviated content of requested data, when the Web server can satisfy at last a portion of the HTTP request at a present time even if at least one of the following conditions are present i) the Web server is overloaded, and ii) the Web server is partially functional; and means for receiving full content of the requested data from the Web server at a later time and outside of the given session via e-mail to an e-mail address of a user of the client.

5. A computer program having program code means on a computer usable medium for enabling a web server having means for communicating with at least one client in a network environment, the program comprising:

means for receiving an HTTP request for data from the client during a given session of a network communication;

means for determining if at least one of the following conditions are present i) the web server is overloaded, and ii) the web server is partially functional;

means for determining whether the web server can satisfy at least a portion of the HTTP request at a present time even if at least one of the conditions is present;

means for sending a portion of the data to the client during the given session; and means, by e-mail to an e-mail address of a user using the client, for sending all of the requested data at a later time and outside of the given session if it is determined that the web server is capable of satisfying the portion of the HTTP request at the present time.

6. A method for use by a first server in a network environment comprising:

receiving a request for data from a client during a given session of a network communication;

determining if at least one of the following conditions are present i) the server is overloaded, and ii) the server is partially functional;

determining whether the first server can satisfy at least a portion of the request at a present time even if at least one of the conditions is present;

sending a portion of the data to the client during the given session; and sending, by e-mail to an e-mail address of a user using the client, all of the requested data at a later time and outside of the given session if it is determined that the first server is capable of satisfying the portion of the request at the present time.

7. A server having means for communicating with a client in a network environment, the server comprising:

means for receiving a request from the client for data during a given session of a network communication;

means for determining if at least one of the following conditions are present i) the server is overloaded, and ii) the server is partially functional;

means for determining whether the first server can satisfy at least a portion of the request at a present time even if at least one of the conditions is present;

means for sending a portion of the data to the client during the given session; and means for sending, by e-mail to an e-mail address of a user using the client, all of the requested data at a later time and outside of the given session if it is determined that the first server is capable of satisfying the portion of the request at the present time.

8. A computer program having program code means on a computer usable medium for enabling a server having means for communicating with at least one client in a network environment, the program comprising:

means for receiving a request for data from the client during a given session of a network communication;

means for determining if at least one of the following conditions are present i) the server is overloaded, and ii) the server is partially functional;

means for determining whether the first server can satisfy at least a portion of the request at a present time even if at least one of the conditions is present;

means for sending a portion of the data to the client during the given session; and means, by e-mail to an e-mail address of a user using the client, for sending all of the requested data at a later time and outside of the given session if it is determined that the first server is capable of satisfying the portion of the request at the present time.

* * * * *